US007991555B2

(12) United States Patent
Yang et al.

(10) Patent No.: US 7,991,555 B2
(45) Date of Patent: Aug. 2, 2011

(54) ELECTROMAGNETIC DIRECTIONAL MEASUREMENTS FOR NON-PARALLEL BED FORMATIONS

(75) Inventors: Jian Yang, Sugar Land, TX (US);
Qiming Li, Sugar Land, TX (US);
Dzevat Omeragic, Lexington, MA (US);
Jean Seydoux, Houston, TX (US);
Jacques R. Tabanou, Houston, TX (US); Bernadette Tabanou, legal representative, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 548 days.

(21) Appl. No.: 12/182,896

(22) Filed: Jul. 30, 2008

(65) Prior Publication Data

US 2010/0030477 A1   Feb. 4, 2010

(51) Int. Cl.
*G01V 3/30* (2006.01)
(52) U.S. Cl. ............ 702/9; 702/7; 702/11; 702/14; 324/338; 324/339; 324/343; 340/854.6
(58) Field of Classification Search .......... 702/7, 9, 702/11, 14; 324/339, 338, 343; 340/854.6
See application file for complete search history.

(56) References Cited

U.S. PATENT DOCUMENTS

| 5,781,436 | A * | 7/1998 | Forgang et al. .............. 702/7 |
| 5,881,310 | A * | 3/1999 | Airhart et al. ............... 710/3 |
| 6,690,170 | B2 * | 2/2004 | Homan et al. ............. 324/339 |
| 6,856,909 | B2 * | 2/2005 | Banning-Geertsma ....... 702/7 |
| 6,950,748 | B2 * | 9/2005 | Liu et al. .................... 702/7 |
| 7,202,670 | B2 * | 4/2007 | Omeragic et al. ......... 324/338 |
| 7,382,135 | B2 * | 6/2008 | Li et al. .................... 324/338 |
| 7,538,555 | B2 * | 5/2009 | Banning et al. ........... 324/338 |
| 2003/0051914 | A1 * | 3/2003 | Bittar ........................ 175/45 |
| 2005/0092487 | A1 * | 5/2005 | Banning et al. ......... 166/254.1 |
| 2005/0114030 | A1 * | 5/2005 | Liu et al. .................. 702/11 |
| 2006/0074561 | A1 | 4/2006 | Xia et al. |
| 2008/0136419 | A1 * | 6/2008 | Seydoux et al. .......... 324/333 |
| 2009/0230968 | A1 * | 9/2009 | Bittar et al. .............. 324/338 |
| 2010/0117855 | A1 * | 5/2010 | Sinclair et al. ......... 340/854.6 |

OTHER PUBLICATIONS

Q. Li, et al., "New Directional Electromagnetic Tool for Proactive Geosteering and Accurate Formation Evaluation while Drilling," 2005 SPWLA Technical Symposium, Paper QQQ.
Omeragic et al., "Deep Directional Electromagnetic Measurement for Optimal Well Placement," SPE Annual Technical Conference and Exhibition, SPE 97045 (2005).

* cited by examiner

*Primary Examiner* — Carol S Tsai
(74) *Attorney, Agent, or Firm* — Darla Fonseca; Jeff Griffin; Charlotte Rutherford

(57) ABSTRACT

An orientation vector, referred to hereinafter as the "geosteering vector," is directed to the more conductive formation area within the DOI of the tool and away from the more resistive formation areas. Accordingly, drilling in a direction opposite the geosteering vector leads to more resistive formation. Also, the disclosed geosteering vectors obtained from the real and imaginary components will not align with each other for non-planar formations and therefore the misalignment of the geosteering obtained from real and imaginary components is indicative of a non-planar formation. A superposition method is disclosed which can be used to calculate electromagnetic (EM) couplings in a non-planar geometry formation (as well as in a planar geometry formation) in real time, without requiring two or three dimensional modeling calculations.

20 Claims, 6 Drawing Sheets

ELECTROMAGNETIC DIRECTIONAL MEASUREMENTS FOR NON-PARALLEL BED FORMATIONS

BACKGROUND

1. Technical Field

Techniques are disclosed enhancing well placement using ultra deep resistivity tools in logging while drilling (LWD), measurement-while-drilling (MWD), and directional drilling (Geo-steering) applications. The disclosed techniques include methods for locating the most conductive formation region relative to the tool, determining distances and relative directions of formation layer boundaries, whether a tool is approaching a layer boundary from above or below the layer boundary, whether a formation is planar or non-planar, and superposition techniques for evaluating complex non-planar formations in real time without carrying out multi-dimensional modeling calculations.

2. Description of the Related Art

An alternative to wireline logging techniques is the collection of data on downhole conditions during the drilling process. By collecting and processing such information during the drilling process, the driller can modify or correct key steps of the operation to optimize performance. Schemes for collecting data of downhole conditions and movement of the drilling assembly during the drilling operation are known as measurement-while-drilling ("MWD"). Similar techniques focusing more on measurement of formation parameters than on movement of the drilling assembly are known as logging-while-drilling ("LWD"). However, the terms MWD and LWD are often used interchangeably, and the use of either term in this disclosure will be understood to include both the collection of formation and borehole information, as well as data on movement and placement of the drilling assembly.

Boreholes are frequently drilled horizontally in petroleum reservoirs to increase the drainage area, or the length of the borehole passing through the reservoir. Because petroleum reservoirs are typically located in layered earth formations, the position of a horizontal borehole with respect to the boundaries of the formation layer will often affect the productivity of the borehole. Specifically, water is heavier than hydrocarbons and therefore is disposed below hydrocarbons in a formation layer, or towards the bottom layer boundary. Hence, it is advantageous to drill or land the borehole near the top or upper layer boundary as opposed to the bottom layer boundary. Conversely, when placing a drain-hole or water disposal well, it is advantageous to place the well near the bottom layer boundary. The estimation of distances to layer boundaries, both top and bottom, is therefore important for production well landing and drain-hole positioning.

Various techniques for estimating the borehole position with respect to layer boundaries include those based on well logging measurements made for nearby or "offset" boreholes. These techniques assume that the composition and the geometry of the formation layers proximate to the borehole of interest are substantially the same as in the offset boreholes. Often, this assumption leads to inadequate results.

Other techniques are based on the observation of features, referred to as "horns," which appear in measurements made by electromagnetic-type well logging instruments. When an electromagnetic instrument approaches a layer boundary with a large contrast in resistivity, a significant distortion of the resistivity signal magnitude, known as a horn, occurs. Qualitative estimates of the distance between the instrument and the layer boundary may be made by observing the magnitude of the horn.

Measurement-while-drilling (MWD) tools are available to guide drill strings and therefore the resulting boreholes into more productive reservoir zones. MWD tools used for this purpose typically have been propagation resistivity tools with a 360° measurement and deep imaging capability to detect fluid contacts and formation changes up to 15 feet from the borehole. However, the propagation resistivity MWD tools are non-azimuthal, and therefore do not indicate whether formation boundaries are above or below the tool. To compound this problem, most propagation resistivity measurements do not extend far enough beyond the tool to warn the driller in time to avoid drilling out of the intended reservoir layer. As a result of these deficiencies, the use of propagation resistivity MWD tools can lead to poor well placement.

As an improvement over propagation resistivity MWD tools, Schlumberger developed the PERISCOPE™ 15 deep imaging MWD tools, which incorporate tilted and transverse antennas in the drilling collar. The non-axial antennae obtain directional electromagnetic measurements that are used to determine distance and azimuthal orientation of formation boundaries in any type of mud. These measurements are transmitted uphole and displayed on a graphical interface to provide information on distance to boundaries, formation resistivity and orientation.

One of the important aspects of the PERISCOPE™ 15 technology is that the directional phase shift and attenuation sign change depends on whether the conductive shoulder layer is above or below the layer where the tool is located. This so-called polarity change can be used for geo-steering purposes. Further the PERISCOPE™ 15 tools can be used to determine bedding orientation to indicate how much the boundary is tilted to the right or to the left with respect to the up direction. However, this definition conveys no information as whether the tool string is approaching the reservoir boundary from above or below the boundary.

Therefore, a need exists for more accurate methods of well placement, which provides directional measurements while drilling so steering decisions can be made to place the borehole optimally in the reservoir of interest. In order to accomplish improved well placement, the distance to the boundaries of a reservoir and whether the drill string is approaching the reservoir boundary from above or below must be known. Because non-planar formation geometry is often encountered, two-dimensional and three-dimensional modeling is required, which is time-consuming and not suitable for real time interpretation or MWD. Accordingly, a method for evaluating non-planar formation geometry is needed that does not require time-consuming two-dimensional or three-dimensional modeling.

SUMMARY OF THE DISCLOSURE

In satisfaction of the above needs, an orientation vector is defined that can be disposed in any quadrant surrounding a logging tool. The logging tool is a deep imaging induction tool that includes a transmitter and a receiver spaced apart along a tool axis. Preferably, at least one of the transmitter and receiver are tilted an angle with respect to the tool axis. More preferably, the angle is 45°.

The orientation vector, referred to hereinafter as the "geo-steering vector," is directed to the most conductive formation area in a formation and therefore away from the most resistive and possible hydrocarbon-containing formation areas. Accordingly, drilling in a direction opposite the geosteering vector leads to more resistive formation. Also, the disclosed geosteering vectors obtained from the real and imaginary components will not align with each other for non-planar formations and therefore the misalignment of the geosteering obtained from real and imaginary components is indicative of a non-planar formation. Furthermore, a superposition method is disclosed which can be used to calculate electromagnetic (EM) couplings in a non-planar geometry formation, without requiring two or three dimensional modeling calculations.

Therefore, a method is disclosed for determining the direction of a more conductive layer of a multiple layer formation in which a borehole and logging tool is disclosed. The method defines and makes use of a geosteering vector that is described below that is always directed towards the more conductive region inside the depth of investigation of the logging tool.

The disclosed method comprises transmitting an electromagnetic field from the transmitter along a tool plane normal to the tool axis and inducing a voltage at the receiver as a result of the electromagnetic field. The method further comprises measuring induced directional voltages at the receiver along x, y and z-axes, where the x-axis and y-axis are disposed in the tool plane, the x-axis points vertically upward projected onto the tool plane, and z-axis is parallel to or co-axial with the tool axis. The method also comprises calculating the geosteering vector in the tool plane based at least in part upon the voltages induced at the receiver according to the equation (1a), $$\left( \frac{V_{xz}^r}{\sqrt{(V_{xz}^r)^2 + (V_{yz}^r)^2}}, \frac{V_{yz}^r}{\sqrt{(V_{xz}^r)^2 + (V_{yz}^r)^2}}, 0 \right) \quad (1a)$$

wherein $V^r_{xz}$ and $V^r_{yz}$ are real components of the x-directed and y-directed induced voltages respectively.

In a refinement, the calculating of the geosteering vector further comprises calculating an imaginary component based at least in part on the induced voltages at the receiver according to the equation (1b)

$$\left( \frac{V_{xz}^i}{\sqrt{(V_{xz}^i)^2 + (V_{yz}^i)^2}}, \frac{V_{yz}^i}{\sqrt{(V_{xz}^i)^2 + (V_{yz}^i)^2}}, 0 \right), \quad (1b)$$

wherein $V^i_{xz}$ and $V^i_{yz}$ are imaginary components of the x-directed and y-directed induced voltages respectively and wherein the values of equations (1a) and (1b) are averaged.

In a refinement, the method further comprises drilling towards a more resistive area by calculating the geosteering vector as described above and drilling in a direction opposite to the direction defined by the geosteering vector. In a further refinement, the method further comprises drilling perpendicular to the geosteering vector to remain in a given formation.

In another refinement, the method further comprises determining whether the formation is planar by calculating the geosteering vector in the tool plane according to the equation (1a), calculating the geosteering vector in the tool plane according to the equation (1b), comparing the geosteering vector calculated from equation (1a) with the geosteering vector calculated from equation (1b), and if the geosteering vectors are substantially equal, concluding the formation is planar. If the geosteering vectors are not equal, the formation is nonplanar. In a refinement, the geosteering vectors are calculated over a plurality of positions and the geosteering vectors are compared over the plurality of positions. In another refinement, orientation angles $\phi_g$ are calculated from the geosteering vectors and the orientation angles $\phi_g$ are compared. If the orientation angles $\phi_g$ are substantially equal, the formation is planar and if the orientation angles $\phi_g$ are not equal, the formation is nonplanar.

In a refinement, the method further comprises determining if the tool is in a more conductive area or a more resistive area by calculating at least one of a phase shift or attenuation for a plurality of positions in the direction of the geosteering vector. If the phase shift or attenuation increases over the plurality of positions, the tool is in the more resistive area. If the phase shift or attenuation decreases over the plurality of positions, the tool is in the more conductive area.

In the event a tool is used with an axial receiver and tilted transmitter, the following equations (1c) and (1d) are substituted for equations (1a) and (1b) respectively:

$$\left( \frac{-V_{zx}^r}{\sqrt{(V_{zx}^r)^2 + (V_{zy}^r)^2}}, \frac{-V_{zy}^r}{\sqrt{(V_{zx}^r)^2 + (V_{zy}^r)^2}}, 0 \right) \quad (1c)$$

for the real component, and $$\left( \frac{-V_{zx}^i}{\sqrt{(V_{zx}^i)^2 + (V_{zy}^i)^2}}, \frac{-V_{zy}^i}{\sqrt{(V_{zx}^i)^2 + (V_{zy}^i)^2}}, 0 \right) \quad (1d)$$

for the imaginary component.

A method for evaluating complex non-planar formations which is suitable for real time processing is disclosed. When the formation consists of three or more layers and the tool is disposed in a middle layer, the formation is divided into three hypothetical formations. The first hypothetical formation includes the middle layer in which the tool is disposed and any layers disposed above the middle layer. In the first hypothetical formation, any layers disposed below the middle layer are removed, thereby making the middle layer semi-infinite downward. The second hypothetical formation includes the middle layer and any layers disposed below the middle layer. In the second hypothetical formation, any layers disposed above the middle layer are removed thereby making the middle layer semi-infinite upward. The third hypothetical formation is an infinite middle layer in both the upward and downward directions.

In the superposition method, 3×3 electromagnetic (EM) coupling matrices are calculated for the first, second and third hypothetical formations and the EM couplings for the actual formation are calculated as follows:

$$\overline{Z} = \overline{Z}_1 + \overline{Z}_2 - \overline{Z}_3 \quad (2)$$

wherein $\overline{Z}$, $\overline{Z}_1$, $\overline{Z}_2$ and $\overline{Z}_3$ are the 3×3 EM coupling matrices between a transmitter coil and a receiver coil on a tool in the original formation, the first hypothetical formation, the second hypothetical formation, and the third hypothetical formation, respectively. The superposition method also applies to the planar formations.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed methods are illustrated diagrammatically and graphically. In certain instances, details which are not necessary for an understanding of the disclosed methods or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
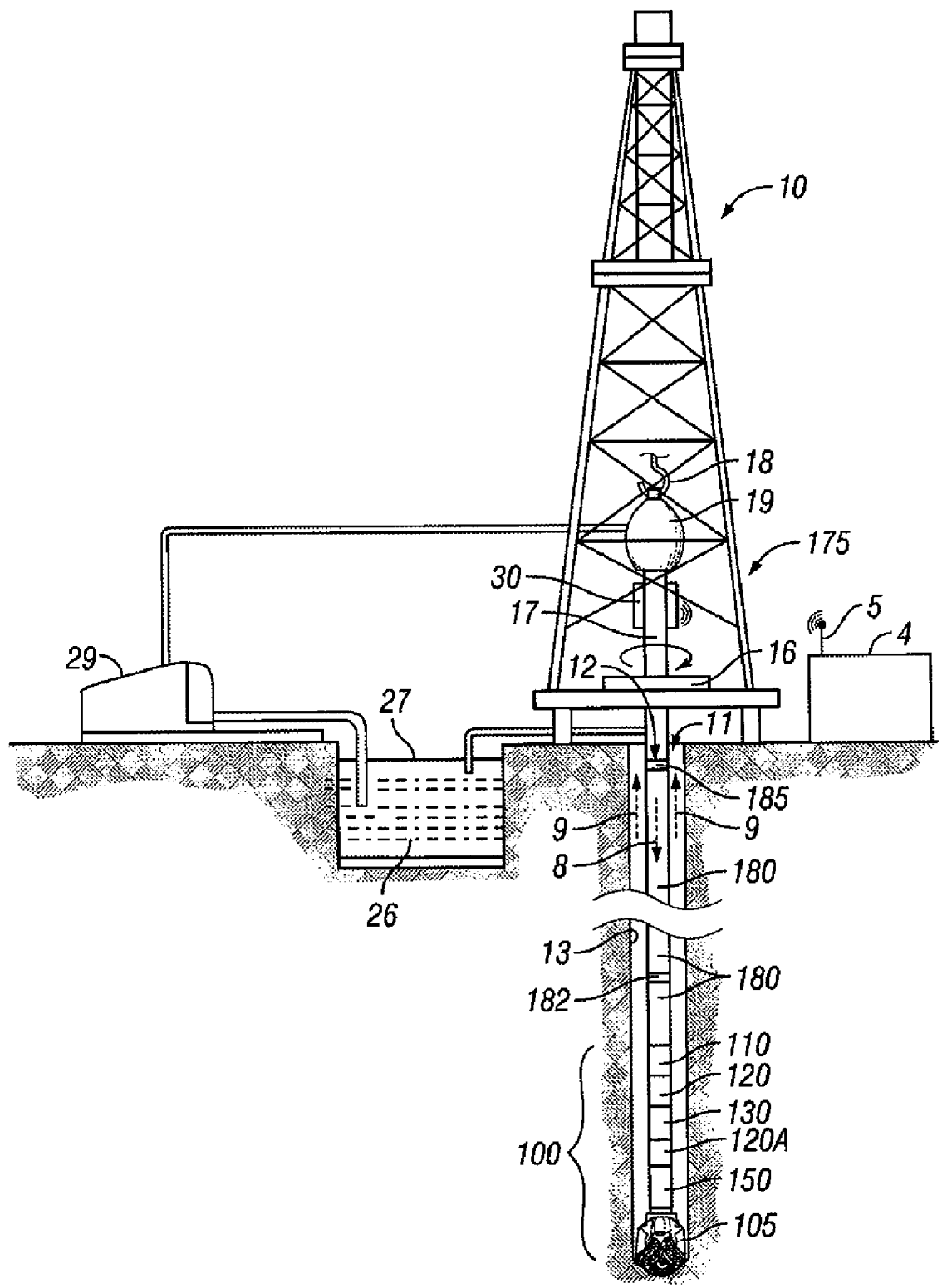
FIG. 1 illustrates, partially in schematic and block form, a wellsite system in which the disclosed methods and techniques can be employed.

FIG. 1 illustrates a wellsite system in which the disclosed methods can be employed. The wellsite can be onshore or offshore. In this exemplary system, a borehole 11 is formed in subsurface formations by rotary drilling in a manner that is well known. Directional drilling can also be used, as will be described hereinafter.

A drill string 12 is suspended within the borehole 11 and has a bottom hole assembly (BHA) 100 which includes a drill bit 105 at its lower end. The surface system includes platform and derrick assembly 10 positioned over the borehole 11 and the assembly 10 includes a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook. As is well known, a top drive system could alternatively be used.

The surface system of FIG. 1 further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall 13 of the borehole 11, as indicated by the directional arrows 9. In this known manner, the drilling fluid 26 lubricates the drill bit 105 and carries formation cuttings up to the surface as it is returned to the pit 27 for recirculation.

The bottom hole assembly 100 includes a logging-while-drilling (LWD) module 120, a measuring-while-drilling (MWD) module 130, a roto-steerable system and motor, and drill bit 105. The LWD module 120 is housed in a special type of drill collar, as is known in the art, and can contain one or a plurality of known types of logging tools. It will also be understood that more than one LWD and/or MWD module can be employed, e.g., as represented at 120A. References, throughout, to a module at the position of 120 can alternatively mean a module at the position of 120A as well. The LWD module 120 includes capabilities for measuring, processing, and storing information, as well as for communicating with the surface equipment. The LWD module 120 includes a directional resistivity measuring device, such as one of the Schlumberger PERISCOPE™ directional deep imaging 360' resistivity tools.

The MWD module 130 is also housed in a type of drill collar, as is known in the art, and can contain one or more devices for measuring characteristics of the drill string and drill bit. The MWD tool 130 further includes an apparatus (not shown) for generating electrical power to the downhole system, such as a mud turbine generator powered by the flow of the drilling fluid. Other power and/or battery systems may be employed. The MWD module 130 may include one or more of the following types of measuring devices: a weight-on-bit measuring device, a torque measuring device, a vibration measuring device, a shock measuring device, a stick slip measuring device, a direction measuring device, and an inclination measuring device.

In the system of FIG. 1, a drill string telemetry system is employed which, in the illustrated embodiment, comprises a system of inductively coupled wired drill pipes 180 that extend from a surface sub 185 to an interface sub 110 in the bottom hole assembly 100. Depending on factors including the length of the drill string, relay subs or repeaters can be provided at intervals in the string of wired drill pipes, an example being shown at 182. The interface sub 110 provides an interface between the communications circuitry of the LWD and MWD modules 120, 130 and the drill string telemetry system which, in this embodiment, comprises wired drill pipes with inductive couplers 180. At the top of the wired drill string 180, a further interface sub 185, can be provided, and serves, in this case, as a surface sub. The wired drill pipes 180 can be coupled with an electronics subsystem 30 that rotates with kelly 17 and includes a transceiver and antenna that communicate bidirectionally with antenna and transceiver of logging and control unit 4 which includes the uphole processor subsystem. In FIG. 1, a communication link 175 is schematically depicted between the electronics subsystem 30 and antenna 5 of the logging and control unit 4. Accordingly, the configuration of FIG. 1 provides a communication link from the logging and control unit 4 through communication link 175, to surface sub 185, through the wired drill pipe telemetry system, to downhole interface 110 and the components of the bottom hole assembly 110 and, also, the reverse thereof, for bidirectional operation.

While only one logging and control unit 4 at one wellsite is shown, one or more surface units across one or more wellsites may be provided. The surface units may be linked to one or more surface interfaces using a wired or wireless connection via one or more communication lines. The communication topology between the surface interface and the surface system can be point-to-point, point-to-multipoint or multipoint-to-point. The wired connection includes the use of any type of cables or wires using any type of protocols (serial, Ethernet, etc.) and optical fibers. The wireless technology can be any kind of standard wireless communication technology, such as IEEE 802.11 specification, Bluetooth, zigbee or any non-standard RF or optical communication technology using any kind of modulation scheme, such as FM, AM, PM, FSK, QAM, DMT, OFDM, etc. in combination with any kind of data multiplexing technologies such as TDMA, FDMA, CDMA, etc.

Figure 2:
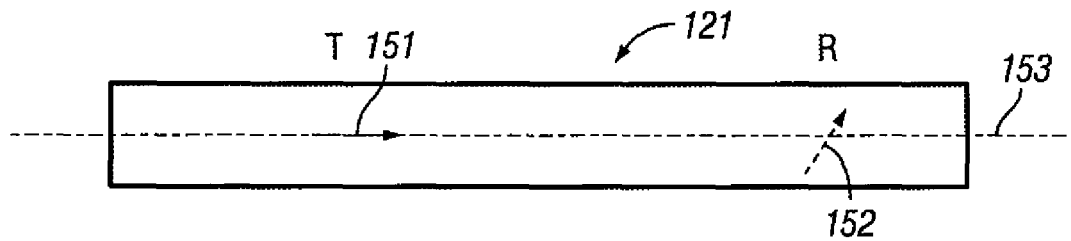
FIG. 2 is a partial schematic view of a deep imaging resistivity tool which can be used to practice the disclosed methods and techniques.
Figure 3A:
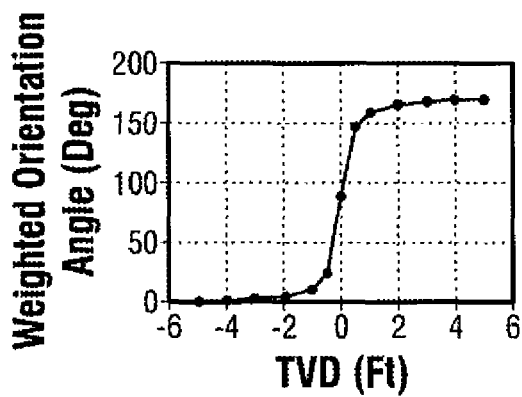
FIG. 3 illustrates, graphically, relationships between weighted orientation angle $\phi_g$, orientation angle $\phi_g$, phase shift and attenuation versus true vertical depth (TVD) using values for geosteering vector versus TVD for the formation illustrated in FIG. 4 and based on simulated data from a 360° deep resistivity tool with an 8 foot transmitter/receiver spacing, an axial transmitter, a 45° receiver and operated at 100 kHz.
Figure 3B:
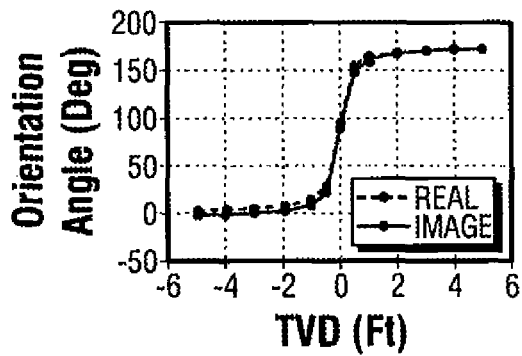
Figure 3C:
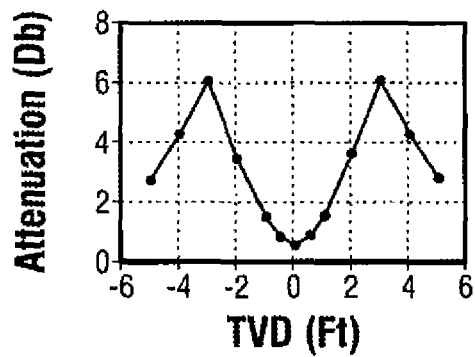
Figure 3D:
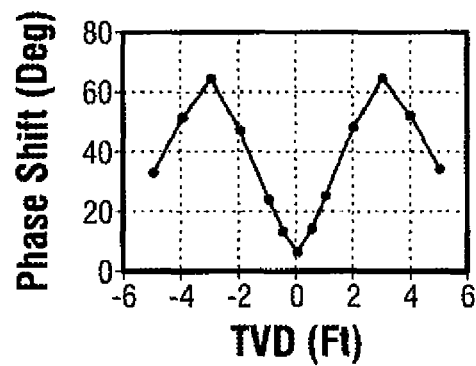

FIG. 2 is a simplified schematic view of a directional deep-reading logging-while-drilling drilling tool 121, as part of the LWD tool or tools 120 in FIG. 1. Signals from tools having axially aligned cylindrically symmetrical coils are not directionally sensitive. The tool 121 of FIG. 2 includes an axially aligned transmitter 151 and a tilted or transverse coil for the receiver 152 to obtain directionally sensitive measurements. While only one transmitter 151 and one receiver 152 are shown in FIG. 2, the tool 121 will typically include a sensor array (not shown) that includes approximately six transmitter antennas and approximately four receiver antennas, with one or more the transmitters directed transversely to the axis of the tool 121 and two or more of the receivers tilted 45° with respect to the tool axis 153. Magnetometers and accelerometers can provide reference directional orientation data for the tool 121. In addition to its directional capability, the tool 121 provides relatively deep measurements with its 8 foot transmitter 151/receiver 152 spacing. The tool 121 preferably operates at a frequency of 100 kHz. The substantially real time bidirectional drill string telemetry, in conjunction with the capabilities of the directional resistivity logging tool 121, improves performance of geosteering by increasing the amount of data at the surface and the speed and precision of directional drilling control. Because the methods disclosed below make use of one transmitter 151/receiver 152 pair at a time, the tool 121 is shown with only one pair 151/152, although it will be understood that the disclosed methods apply tools with a sensor array of multiple transmitter and receiver antennas.

With that background information in mind, an orientation vector is defined that can be disposed in any quadrant surrounding the tool 121. The orientation vector, referred to hereinafter as the "geosteering vector," is directed to the most conductive formation area in formations and therefore away from the most resistive and possible hydrocarbon-containing formation areas. Following a path opposite the direction of the geosteering vector will lead into the center of a more resistive area, and therefore potentially a reservoir as the geosteering vector is directed to the more conductive area. Also, the disclosed geosteering vectors, obtained from the real and imaginary components, will not align with each other for non-planar formations and therefore the misalignment of these components is indicative of a non-planar formation. Conversely, the alignment of geosteering vectors obtained from real and imaginary components is indicative of a planar formation. Furthermore, a superposition method is disclosed which can be used to calculate electromagnetic (EM) couplings in a non-planar geometry formation in real time, without two-dimensional or three-dimensional modeling calculations.

Geosteering Vector

The voltage at a receiver 152 induced by an electromagnetic field transmitted from a transmitter 151 has previously been written in terms of Fourier series of azimuth angle up to the $1^{st}$ order. The constant term is proportional to the induced voltage $V_{zz}$, and the coefficients of the cos $\phi$ and sin $\phi p$ terms are in proportional to $V_{xz}$ and $V_{yz}$ respectively, where $\phi$ is the azimuth angle of the receiver. As disclosed herein, a new vector in the tool plane is defined as follows:

$$\left(\frac{V_{xz}^r}{\sqrt{(V_{xz}^r)^2 + (V_{yz}^r)^2}}, \frac{V_{yz}^r}{\sqrt{(V_{xz}^r)^2 + (V_{yz}^r)^2}}, 0\right) \tag{1a}$$

for the real component and $$\left(\frac{V_{xz}^i}{\sqrt{(V_{xz}^i)^2 + (V_{yz}^i)^2}}, \frac{V_{yz}^i}{\sqrt{(V_{xz}^i)^2 + (V_{yz}^i)^2}}, 0\right) \tag{1b}$$

for the imaginary component.

These two vectors (1a and 1b) are not equivalent except for (1) planar formation geometry or (2) when a symmetry plane exists along the tool axis 153. As these two vectors point towards the more conductive region of the formation, a weighted average of these two vectors can be used to determine the direction of a conductive region and conversely, a direction opposite the more resistive region.

In a two layer formation, a weighted average of the above vectors of equations (1a) and (1b) points to the conductive layer whether the tool is on the resistive layer side or on the conductive layer side. Furthermore, the phase-shift and attenuation values can be obtained by taking the logarithm of the ratio of the complex voltage signals at two opposite orientations, with one in the direction of the geosteering vector. The calculations of phase-shift and attenuation values are well known to those skilled in the art and will not be repeated here.

It should be pointed out that by making the transmitter 151 tilted and the receiver 152 axial of the tool 121 as depicted in FIG. 2, one can show that the voltage at a receiver 152 introduced by an electromagnetic field transmitted from the transmitter 151 can also be written in terms of Fourier series of azimuth angle up to the $1^{st}$ order. The constant term is proportional to $v_{zz}$ as set forth above, but the coefficients of the cos $\phi$ and sin $\phi$ terms are in proportional to $V_{zx}$ and $V_{zy}$ respectively. A geosteering vector in the tool plane for this reverse configuration for the tool 121 can be defined as:

$$\left( \frac{-V_{zx}^r}{\sqrt{(V_{zx}^r)^2 + (V_{zy}^r)^2}}, \frac{-V_{zy}^r}{\sqrt{(V_{zx}^r)^2 + (V_{zy}^r)^2}}, 0 \right) \quad (1c)$$

for the real component, and $$\left( \frac{-V_{zx}^i}{\sqrt{(V_{zx}^i)^2 + (V_{zy}^i)^2}}, \frac{-V_{zy}^i}{\sqrt{(V_{zx}^i)^2 + (V_{zy}^i)^2}}, 0 \right) \quad (1d)$$

for the imaginary component. As indicated above, the phase-shift and attenuation values can be obtained by taking the logarithm of the ratio of the complex voltage signals at two opposite orientations, with one in the direction of the geosteering vector.

Figure 4:
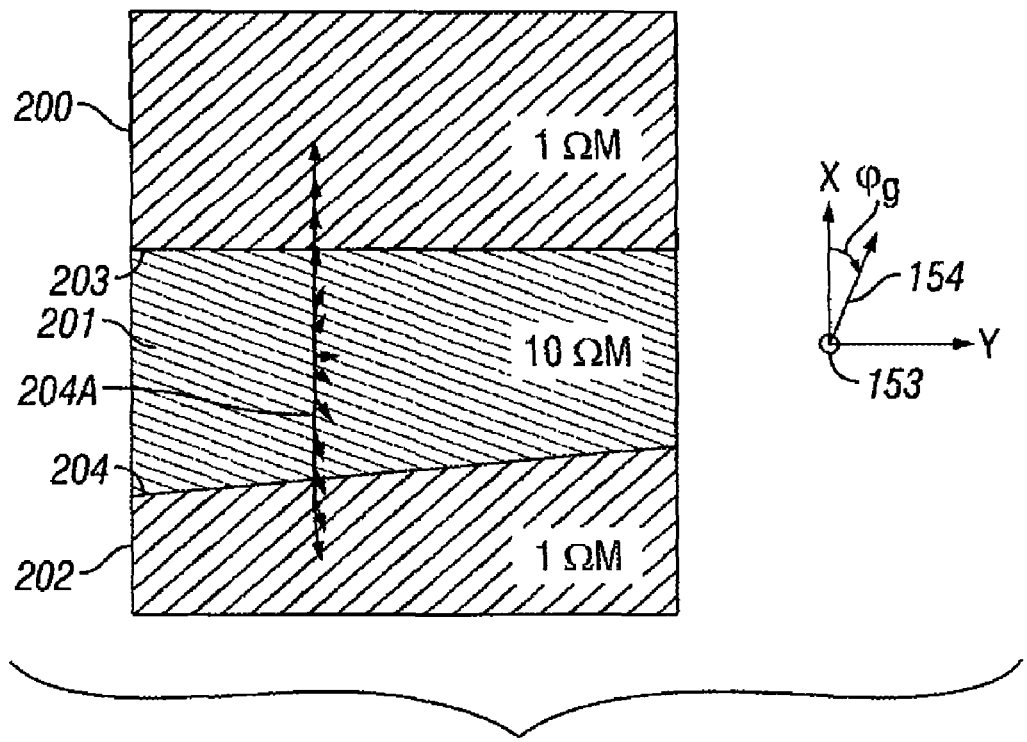
FIG. 4 diagrammatically illustrates a three layer formation with 1-Ωm top and bottom layers and a 10-Ωm middle layer having a thickness of 6 feet, particularly illustrating the relationship between the orientation angle $\phi_g$ and the x-axis along the up direction projected onto the tool plane (the tool is disposed along the z-axis into the page), and wherein orientation angle $\phi_g$, phase shift and attenuation values for the formation of FIG. 4 are illustrated graphically in FIG. 3.
Figure 5A:
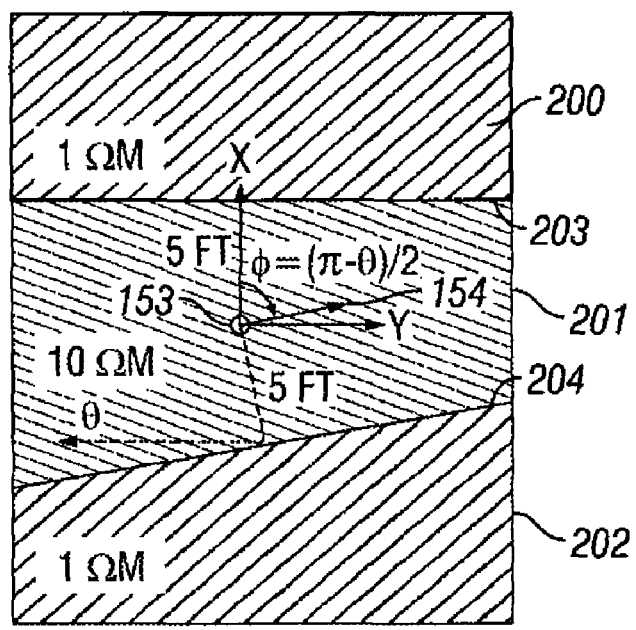
FIG. 5A is a diagrammatic illustration of a formation similar to the formation illustrated in FIG. 4 but with a thicker middle layer and further illustrating the orientation angle $\phi_g$ when the tool lies in a plane that bisects the middle layer so that the electromagnetic properties are symmetric with respect to the plane resulting in the orientation angle $\phi_g$ being equal to $(\pi-\theta/2$ where $\theta$ is the tilt angle of the bottom boundary with respect to the top boundary.
Figures 1, 5B:
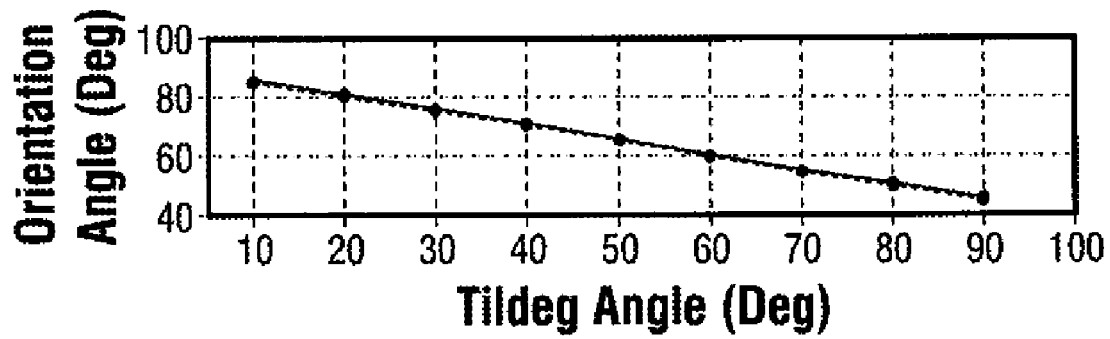
FIG. 5B graphically illustrates orientation angle $\phi_g$, attenuation and phase shift as a function of tilt angle $\theta$.
Figures 2, 5B:
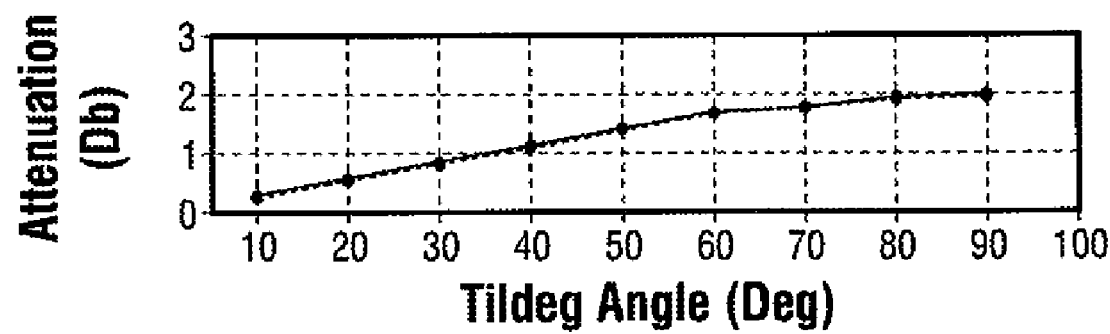
Figures 3, 5B:
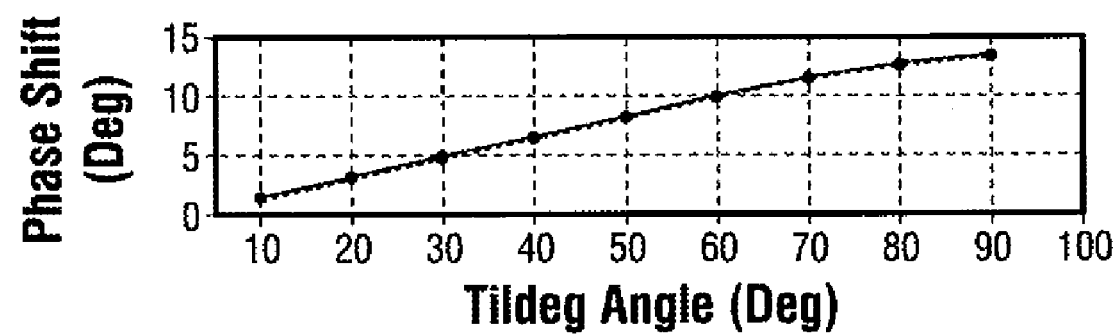

FIG. 3 graphically presents simulated results of a tool 121 with an axial transmitter and 45° tilted receiver as shown in FIG. 2 with an eight foot spacing at 100 kHz. The formation, as illustrated in FIG. 4, consists of three layers 200, 201, 202 with 1-ohm resistivity for the top layer 200 and the bottom layer 202, and 10-ohm resistivity for the middle layer 201 which as a thickness of six (6) feet. The borehole is horizontal.

The top-left panel of FIG. 3 is a graphical presentation of the weighted orientation angle $\phi_g$ taken from both the real and imaginary components as a function of true vertical depth (TVD). The orientation angle $\phi_g$ is the angle of the geosteering vector 154 (see the small arrows in FIG. 4) with respect to the x-axis of the tool (see the diagram on the right side of FIG. 4).

The geosteering vector 154 defined above is schematically shown at various depths in FIG. 4. The z-axis is disposed along the downhole direction of the tool 121 or along the tool axis 153 which, in the case of FIG. 4 (and FIGS. 5A, and 6A-6B), points directly into the page. The x-y plane is the "tool plane" or the plane in which the tool collected data, and the x-axis is disposed along the up direction projected onto the tool plane. The arrow 154 (FIG. 4) is a geosteering vector for a particular TVD and $\phi_g$ is the orientation angle of the geosteering vector 154 with respect to the x-axis at the particular TVD. When the tool 121 is disposed in the top layer 200, three (3) feet above the first boundary 203, the geosteering vector 154 is approximately 0° or pointing upward or through the more conductive layer 200 as shown in FIG. 4. When the tool 121 is disposed in the middle of the less conductive middle layer 201, the geosteering vector then increases to about 90°, or between the more conductive layers 200, 202. When the tool 121 is disposed in the lower layer 202, the geosteering vector 154 continually increases to about 170°, which is essentially pointing downward in FIG. 4 through the bottom layer boundary 204.

The top-right graph of FIG. 3 graphically shows the orientation angle $\phi_g$, obtained separately from both real and imaginary components. As discussed above, $\phi_g$ from the real and imaginary components are not in alignment in the presence of the non-parallel formation layer boundaries. Therefore, the orientation angles $\phi_g$ calculated from the real and imaginary components of equations 1a, 1b respectively are not equal as illustrated in the upper right graph of FIG. 3. The bottom two graphs of FIG. 3 illustrate the attenuation and phase shift measurements as a function of depth, both of which peak at the bed boundaries 203 and 204 and always have non-negative values.

A determination as to whether the tool 121 is in the more conductive area or the more resistive area of the formation can be made using the phase shift or attenuation values illustrated at the bottom of FIG. 3. Specifically, as the tool 121 approaches the upper layer boundary 203 in FIG. 4, and the phase shift and/or attenuation increases as shown by the two right peaks in the lower graphs of FIG. 3, the drilling engineer can confirm that well is being drilled in the direction of the geosteering vector 154 and therefore the tool 121 is located in the more resistive area 201 of the formation in the tool is approaching the layer boundary 203 from the more resistive layer 201.

Similarly, as the tool 121 approaches the lower layer boundary 204 in FIG. 4, and the phase shift and/or attenuation increases as shown by the left right peaks in the lower graphs of FIG. 3, the drilling engineer can confirm that well is being drilled in the direction of the geosteering vector 154 and therefore the tool 121 is located in the more resistive area 201 of the formation as the tool is approaching the lower layer boundary 204 from the more resistive layer 201.

Referring to FIGS. 4 and 5, when the tool 121 is disposed in the middle of the middle layer 201 and the upper and bottom layers 200, 202 are of the same resistivity values but with parallel boundaries 203, 204a (FIG. 4), the signals are zero, and the geosteering vector is not defined. When one of the boundaries such as 204a in FIG. 4 is tilted by the angle θ, a plane exists in which the tool 121 lies and the plane bisects the middle layer 201. In this plane, all of the EM properties are symmetric with respect to the plane. The geosteering vector lies in this plane and is normal to the tool axis 153. Therefore, the orientation angle $\phi_g=(\pi-\theta)/2$, points half-way between the normal of the upper boundary 203 and the normal of the bottom boundary 204 as shown in FIG. 5.

Figure 6A:
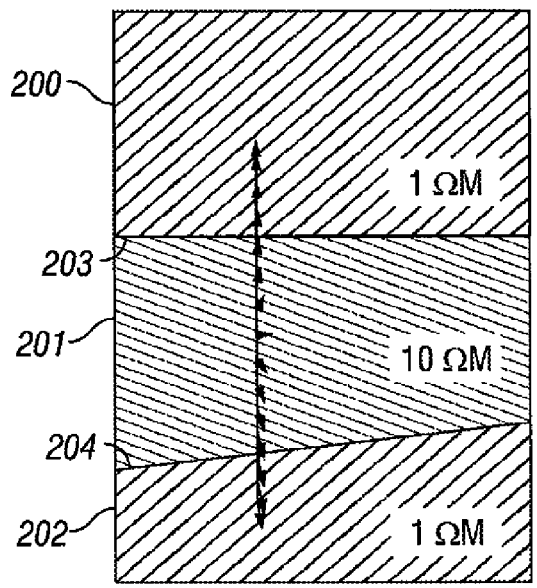
FIG. 6A diagrammatically illustrates another formation wherein the resistivities of the top and bottom layers are equal, similar to the formations illustrated in FIGS. 4 and 5A.
Figure 6B:
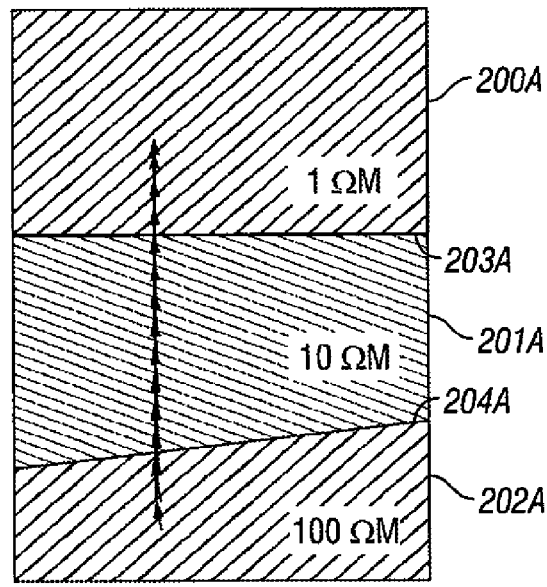
FIG. 6B diagrammatically illustrates yet another formation wherein the resistivities of the top and bottom layers are not equal, in contrast to the formations of FIGS. 4, 5A and 6A.

Referring to FIGS. 6A and 6B, if the top and bottom layers 200, 202 have very different resistivities, the above statements no longer apply. In FIG. 6A, the top and bottom layers 200, 202 have the same resistivity values, and in FIG. 6B, the top and bottom layers 200, 202a have very different resistivity values. As shown in FIG. 6A, when the upper and lower resistivities are the same, the geosteering vector 154 rotates from one direction to another and in FIG. 6B, when the upper and lower resistivities vary greatly, the change is less pronounced. In any event, the geosteering vector 154 is defined as the weighted average from the normal vectors of both boundaries 203, 204 or 203, 204a, with the effective weight of each component being dependent on the distances to the boundaries and the conductivity contrasts. The normal vectors of the both layer boundaries 203, 204 (FIG. 6A) or 203, 204a (FIG. 6B) should be defined such that they are pointing towards the more conductive upper layer 200, 200a.

Superposition Method for Non-Planar Geometry

When formations of non-planar geometry are encountered, two-dimensional and/or three-dimensional modeling is required) which is very time-consuming and not suitable for real time interpretation. To overcome this problem, a superposition method is provided for the structural formations, such as the formation 299 illustrated in FIG. 7.

Figure 7:
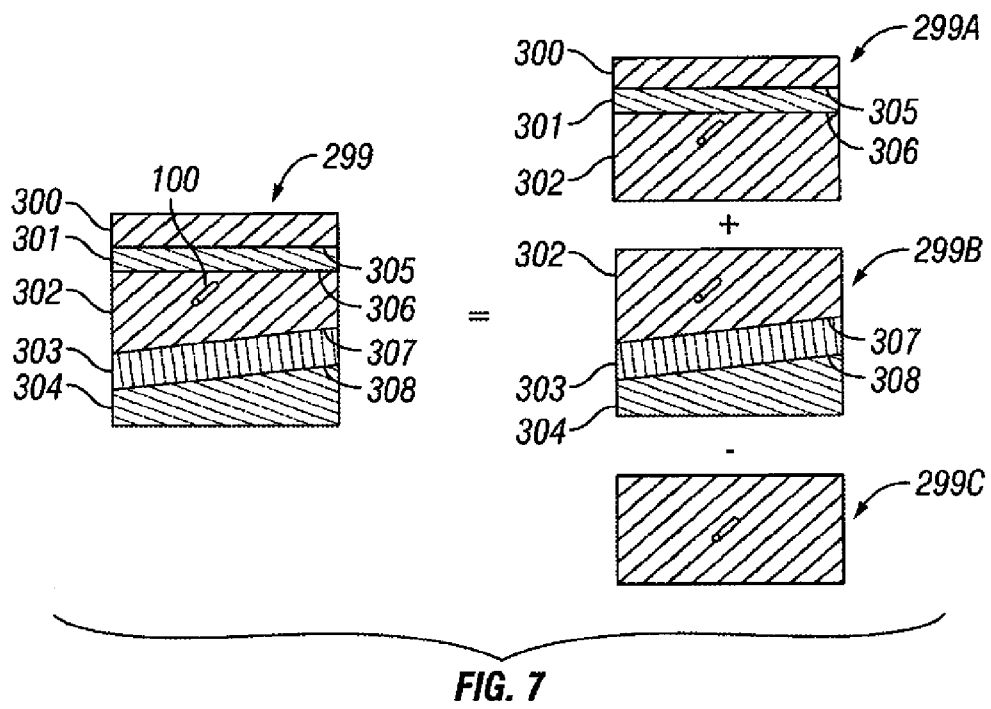
FIG. 7 diagrammatically illustrates the superposition method disclosed herein for determining formation parameters for complex formations without performing two-dimensional or three-dimensional modeling.

As shown in FIG. 7, the "actual" formation 299 consists of multiple layers 300-304. In the illustrated example, the tool 100 is located in the layer 302 and the boundaries 305, 306 disposed above the layer 302 are parallel to. Further, the boundaries 307, 308 disposed below the layer 302 are parallel to each other. However, the boundaries 305, 306 above the layer 302 and the boundaries 307, 308 below the layer 302 can be of any arbitrary angle.

The disclosed superposition method divides the actual formation 299 into three formations 299a, 299b, 299c (see the right side of FIG. 7) and approximates the EM couplings of the actual formation 299 as the sum of the EM couplings of the first and second formations 299a, 299b, subtracted by the EM couplings of the third formation 299c.

The first formation 299a is obtained from the actual formation 299 by removing all the layers 303, 304 below the tool layer 302, and making the tool layer 302 semi-infinite downward. The tool 100 location and orientation with respect to the remaining layers 300, 301 remain unchanged.

The second formation 299b is obtained from the actual formation 299 by removing all the layers 300, 301 above the tool layer 302, and making the tool layer 302 semi-infinite upward. The tool 100 location and orientation in the layer 302 with respect to the remaining layers 303, 304 remain unchanged.

The third formation 299c is obtained from the actual formation 299 by removing all of the layers 300, 301, 303, 304 above and below the tool layer 302, thereby making the tool layer infinite 302 in the upward and downward directions. Mathematically, the disclosed superposition method can be expressed by the following equation:

$$\overline{Z} = \overline{Z}_1 + \overline{Z}_2 - \overline{Z}_3 \qquad (2)$$

wherein $\overline{Z}$, $\overline{Z}_1$, $\overline{Z}_2$, and $\overline{Z}_3$ are the 3×3 EM coupling matrices between a transmitter coil and a receiver coil on the tool 100 in the original formation 299, the first formation 299a, the second formation 299b, and the third formation 299c, respectively.

Figure 8A:
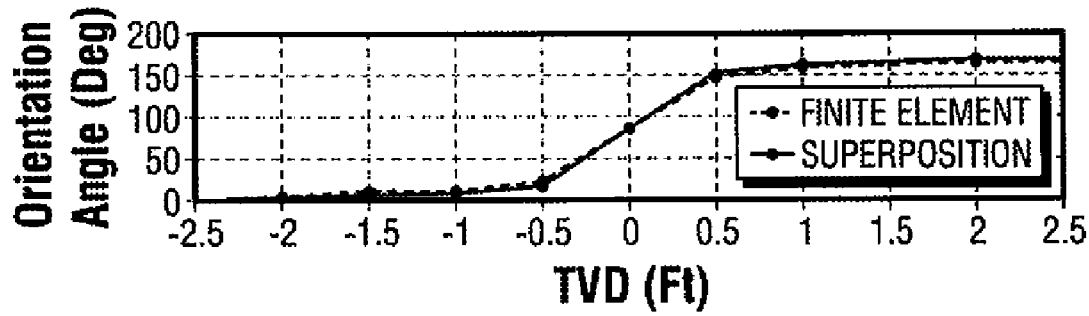
FIG. 8 graphically illustrates values for orientation angle $\phi_g$, attenuation and phase shift as a function of vertical depth and calculated using the disclosed superposition methods illustrated in FIG. 7 and conventional finite element multi-dimensional modeling methods.
Figure 8B:
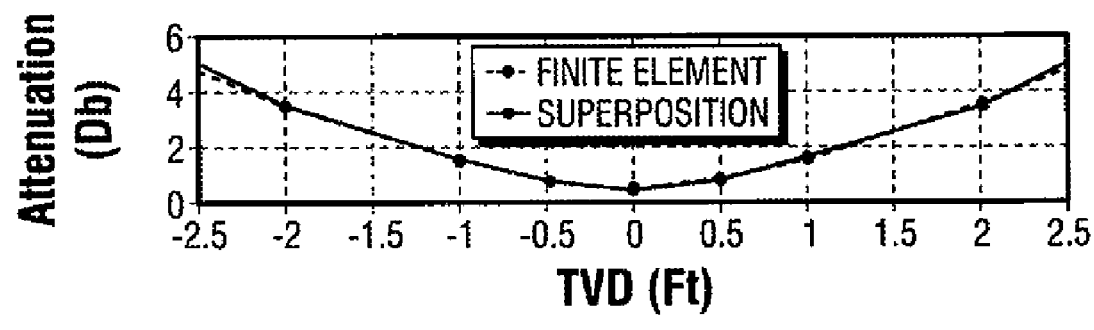
Figure 8C:
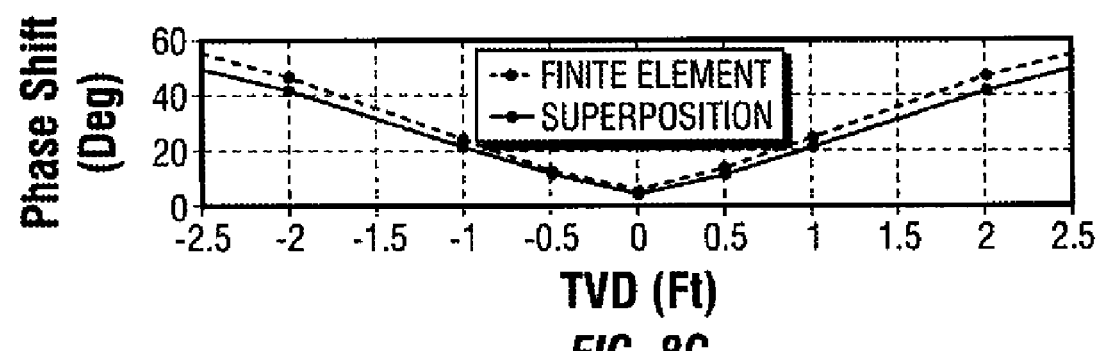

In FIG. 8, orientation angle $\phi_g$, phase shift and attenuation values were calculated using the superposition method and geosteering vector calculation described above and plotted with corresponding results from a Finite Element multi-dimensional modeling results. As one can see from FIG. 8, the superposition method disclosed herein corresponds very well with the multi-dimensional modeling techniques, but can be performed in real time at the well site where known multi-dimensional modeling techniques cannot be performed in real time.

The geosteering vector defined in equations 1a-1d above are directed toward the more conductive area in the tool depth of investigation (~15 feet), whether the tool 121 is in the more resistive area or the more conductive area. Therefore if the well is drilled in the opposite direction of the geosteering vector, it will end in a more resistive area in the neighborhood, a potential reservoir.

The phase shift and attenuation, which are defined by taking the logarithm of the ratio of the complex voltage signals at two opposite orientations, with one in the direction of the geosteering vector, remain positive whether the conductive layer is above or below. The values of the phase shift and attenuation peak at formation the layer boundaries and can be used to determine whether the tool is in a more resistive region or a more conductive region as described above. Specifically, as the tool 121 approaches to a layer boundary, the phase shift (or attenuation) increases. Therefore, if the well is drilled in the direction of the geosteering vector 154 and the phase shift (or attenuation) increases (moving into the boundary), the tool 121 is in the more resistive area as the geosteering vector 154 is always directed towards the more conductive area. Conversely, if the well is being directed away from the geosteering vector 154, and the phase shift or attenuation increases as the tool 121 approaches a layer boundary, the geosteering engineer knows the drill bit is approaching the more resistive area.

The misalignment between the geosteering vector 154 and/or phase angle $\phi_g$ obtained from the real component and the imaginary component can be used to determine whether the formation is of non-planar structure as shown in graph appearing in the upper right corner FIG. 3.

The superposition method disclosed above can be used to calculate electromagnetic (EM) couplings in a non-planar geometry formation, which are intrinsically two or three-dimensional problems. Specifically, the superposition method divides a complex formation into multiple planar geometry formations and calculates the couplings by combining the separate values generated for formation layers disposed above the tool with values generated for formation layers disposed below the tool and subtracting values generated for the formation layer in which the tool is disposed.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method to determine a direction of a more conductive layer of a multiple layer formation penetrated by a borehole, the method comprising:
    disposing a logging tool in the borehole, the logging tool comprising at least one transmitter antenna and at least one receiver antenna, wherein at least one of the antennas is non-axial and the transmitter and receiver antennas are spaced apart along a tool axis;
    transmitting an electromagnetic signal from the transmitter antenna;
    measuring a voltage at the receiver antenna induced by the electromagnetic signal;
    calculating a geosteering vector; and
    determining the direction of the more conductive layer using the geosteering vector.

2. The method of claim 1, wherein the voltage is complex and calculating the geosteering vector further comprises:
    calculating a real geosteering vector based at least in part on the real part of the complex voltage.

3. The method of claim 1, wherein the voltage is complex and calculating the geosteering vector further comprises:
    calculating an imaginary geosteering vector based at least in part on the imaginary part of the complex voltage.

4. The method of claim 1, wherein the voltage is complex and calculating the geosteering vector further comprises:
    calculating a real geosteering vector based at least in part on the real part of the complex voltage;
    calculating an imaginary geosteering vector based at least in part on the imaginary part of the complex voltage; and
    combining the real geosteering vector and the imaginary geosteering vector.

5. The method of claim 1, wherein the non-axial antenna is tilted or transverse.

6. The method of claim 1, wherein the geosteering vector points toward the more conductive layer.

7. The method of claim 1, further comprising making drilling direction decisions based on the geosteering vector.

8. The method of claim 7, wherein the geosteering vector is a real geosteering vector, an imaginary geosteering vector, or a combination of the real and imaginary geosteering vectors.

9. The method of claim 1, further comprising comparing real and imaginary geosteering vectors to determine whether the formation is substantially planar or non-planar.

10. The method of claim 9, wherein the geosteering vectors are calculated over a plurality of positions and the geosteering vectors are compared over the plurality of positions.

11. The method of claim 1, wherein the logging tool is a while-drilling tool or a wireline tool.

12. The method of claim 1, further comprising:
calculating orientation angles from real and imaginary parts of the geosteering vector; and
comparing the orientation angles to determine whether the formation is substantially planar or non-planar.

13. The method of claim 12, wherein the orientation angles are calculated over a plurality of positions and the orientation angles are compared over the plurality of positions.

14. The method of claim 1 further comprising:
calculating at least one of a phase shift or attenuation of the voltage for a plurality of positions in the direction of the geosteering vector; and
determining if the tool is in a more conductive area or a more resistive area.

15. The method of claim 14, further comprising using the phase shift or the attenuation to determine a tool displacement direction relative to the direction of the geosteering vector.

16. The method of claim 1, further comprising making drilling direction decisions based on the geosteering vector, wherein each of the drilling direction decisions is one of: (a) drilling at least in part toward the more conductive layer, (b) drilling at least in part away from the more conductive layer, and (c) drilling neither toward nor away from the more conductive layer.

17. A method to determine formation parameters of a multiple layer formation that includes a middle layer, a plurality of upper layers disposed above the middle layer, and a plurality of lower layers disposed below the middle layer, the method comprising:
disposing a logging tool in the middle layer;
measuring an electromagnetic coupling tensor for the multiple layer formation;
assuming first, second, and third hypothetical formations;
calculating first, second, and third electromagnetic coupling tensors for the first, second, and third hypothetical formations, respectively;
calculating the electromagnetic coupling tensor for the multiple layer formation by combining the first, second, and third electromagnetic coupling tensors; and
determining the formation parameters using the measured electromagnetic coupling tensor and the calculated electromagnetic coupling tensor.

18. The method of claim 17 in which:
the first hypothetical formation comprises the upper layers and the middle layer, and in which the lower layers are replaced by an extension of the middle layer;
the second hypothetical formation comprises the lower layers and the middle layer, and in which the upper layers are replaced by an extension of the middle layer; and
the third hypothetical formation comprises the middle layer and both the upper and lower layers are replaced by extensions of the middle layer.

19. The method of claim 17 wherein the middle layer of the first hypothetical formation is considered to be semi-infinite downward, the middle layer of the second hypothetical formation is considered to be semi-infinite upward, and the middle layer of the third hypothetical formation is considered to be infinite upward and downward.

20. The method of claim 17, in which the formation parameters include horizontal resistivity, vertical resistivity, formation dip, formation dip azimuth, bed boundaries, and bed thickness.

* * * * *